(12) United States Patent
Fitzpatrick et al.

(10) Patent No.: US 11,368,110 B2
(45) Date of Patent: *Jun. 21, 2022

(54) METHOD AND CIRCUIT FOR CONTROLLING OR STARTING A U-SHAPE SINGLE PHASE SYNCHRONOUS PERMANENT MAGNET MOTORS

(71) Applicant: WHIRLPOOL CORPORATION, Benton Harbor, MI (US)

(72) Inventors: Kevin J. Fitzpatrick, St. Joseph, MI (US); Biao He, Stevensville, MI (US); Qiang Mei, Stevensville, MI (US); Ying Xiao, Stevensville, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/076,259

(22) Filed: Oct. 21, 2020

(65) Prior Publication Data

US 2021/0036636 A1 Feb. 4, 2021

Related U.S. Application Data

(63) Continuation of application No. 16/546,528, filed on Aug. 21, 2019, now Pat. No. 10,819,258, which is a
(Continued)

(51) Int. Cl.
*H02P 1/46* (2006.01)
*H02P 6/182* (2016.01)
(Continued)

(52) U.S. Cl.
CPC .......... *H02P 6/182* (2013.01); *A47L 15/4214* (2013.01); *H02P 6/26* (2016.02);
(Continued)

(58) Field of Classification Search
CPC .... H02P 6/182; H02P 6/26; H02P 6/22; H02P 23/12; H02P 23/14; H02P 1/465;
(Continued)

(56) References Cited

U.S. PATENT DOCUMENTS 4,714,851 A 12/1987 Bertram et al.
5,696,430 A 12/1997 Erdman et al.
(Continued)

FOREIGN PATENT DOCUMENTS

DE 102013212876 A1 1/2015
DE 102013218041 A1 3/2015
(Continued)

OTHER PUBLICATIONS

Ya Gao et al., "Study on Control Method of U-Shape Single-Phase Permanent Magnet Synchronous Motor", Proceeding of International Conference on Electrical Machines and Systems 2007, Oct. 8-11, Seoul, Korea, 5 pgs.

*Primary Examiner* — Karen Masih
(74) *Attorney, Agent, or Firm* — McGarry Bair PC

(57) ABSTRACT

A method and circuit for controlling or starting a U-shape single phase synchronous permanent magnetic motor (U-SPSPM motor) having a rotor and a stator and coupled to a single phase alternating current (AC) power source through a switch, including estimating back electromotive force (back-EMF) of the motor based on an observer model with inputs indicative of the measured signals, and triggering the switch to supply power to the motor based on the estimates of the back-EMF.

18 Claims, 5 Drawing Sheets

Related U.S. Application Data continuation of application No. 16/100,274, filed on Aug. 10, 2018, now Pat. No. 10,454,399, which is a continuation of application No. 15/623,512, filed on Jun. 15, 2017, now Pat. No. 10,075,110, which is a continuation of application No. 14/969,858, filed on Dec. 15, 2015, now Pat. No. 9,729,093.

(51) Int. Cl.

| | | |
|---|---|---|
| *A47L 15/42* | (2006.01) | |
| *H02P 23/12* | (2006.01) | |
| *H02P 23/14* | (2006.01) | |
| *H02P 6/26* | (2016.01) | |
| *H02P 25/04* | (2006.01) | |
| *H02P 6/22* | (2006.01) | |

(52) U.S. Cl.
CPC ............. *H02P 23/12* (2013.01); *H02P 23/14* (2013.01); *H02P 25/04* (2013.01); *H02P 1/465* (2013.01); *H02P 6/22* (2013.01)

(58) Field of Classification Search
CPC .......... H02P 25/04; H02P 21/13; H02P 21/18; H02P 25/026; A47L 15/4214
See application file for complete search history.

(56) References Cited

U.S. PATENT DOCUMENTS

| | | |
|---|---|---|
| 5,773,908 A | 6/1998 | Stephens et al. |
| 5,883,490 A | 3/1999 | Moreira |
| 5,986,419 A | 11/1999 | Archer et al. |
| 6,051,952 A | 4/2000 | Moreira et al. |
| 6,078,158 A | 6/2000 | Heeren |
| RE37,576 E | 3/2002 | Stephens et al. |
| 8,164,286 B2 | 4/2012 | Marioni |
| 8,575,873 B2 | 11/2013 | Peterson et al. |
| 2009/0160390 A1 | 6/2009 | Russ et al. |
| 2010/0284769 A1 | 11/2010 | Fritschy et al. |
| 2012/0019187 A1 | 1/2012 | Marioni |
| 2013/0026967 A1 | 1/2013 | Marioni |
| 2013/0234640 A1 | 9/2013 | Bateman et al. |
| 2014/0145662 A1 | 5/2014 | Lee |
| 2021/0281154 A1* | 9/2021 | Xu .................. H02K 11/33 |

FOREIGN PATENT DOCUMENTS

| | | |
|---|---|---|
| KR | 20130084843 A | 7/2013 |
| WO | 2015184047 A1 | 12/2015 |

* cited by examiner

METHOD AND CIRCUIT FOR CONTROLLING OR STARTING A U-SHAPE SINGLE PHASE SYNCHRONOUS PERMANENT MAGNET MOTORS

CROSS-REFERENCE TO RELATED APPLICATION(S)

This application claims priority to and is a continuation of U.S. patent application Ser. No. 16/546,528, filed Aug. 21, 2019, issued as U.S. Pat. No. 10,819,258, issued Oct. 27, 2020, which is a continuation of U.S. patent application Ser. No. 16/100,274, filed Aug. 10, 2018, issued as U.S. Pat. No. 10,454,399, issued Oct. 22, 2019, which is a continuation of U.S. patent application Ser. No. 15/623,512, filed Jun. 15, 2017, now U.S. Pat. No. 10,075,110, issued Sep. 11, 2018, which is a continuation of U.S. patent application Ser. No. 14/969,858, filed Dec. 15, 2015, now U.S. Pat. No. 9,729,093, issued Aug. 8, 2017, which are incorporated herein by reference in its entirety.

BACKGROUND OF THE INVENTION

With the development of the advanced motor control technologies in home appliances, more and more new motor control methods have been proposed to make the home appliance cheaper, more intelligent and smart. Sensorless control is one of the key technologies, which can make motors run without a position sensor, such as a Hall senor, encoder or etc. It is known to use sensorless control in three phase motor control systems. But three phase motors are not often used in the drains systems of home appliances such as dishwashers and washing machines. Rather, such systems broadly use a U-shape single phase synchronous permanent magnet motor (U-SPSPM motor). However, sensorless control of a U-SPSPM motor is not commonly used for several reasons.

A U-SPSPM motor, without knowing the magnetic rotor position, cannot be started in a unidirectional rotation because of cogging torque. Moreover, without rotor position information, any realization of the optimal power regulation will be impossible. Usually a sensor, such as a Hall sensor, is used to get the rotor position information. But there are several trade-offs with use of a sensor-based control: (1) associated costs for a sensor and wiring, (2) required space to add the sensor and circuitry, and (3) added energy consumption. Thus, there is a benefit to achieving sensorless control of a U-SPSPM motor without a physical position sensor.

It is known to provide sensorless control of a U-SPSPM motor with only a voltage signal. Only the voltage signal across the motor is used in this method to estimate the rotor position. A problem with this method is that rotor position information is estimable only when the current is equal to zero, i.e., when $u=e_0$, or when the voltage equals a back-electromotive force. Thus, only detecting motor winding voltage cannot provide a maximum output power and the maximum torque. Consequently, the system will be less efficient based on the same motor design or motor capability.

BRIEF DESCRIPTION OF THE INVENTION

In one aspect, the disclosure relates to a method for starting a U-shape single phase synchronous permanent magnetic motor (U-SPSPM motor) in a desired direction having a rotor and a stator and coupled to a single phase alternating current (AC) power source through a switch. The method includes measuring a feedback signal representative of voltage across the motor leads. Measuring a feedback signal representative of current through the motor. Measuring a feedback signal indicative of a zero-crossing of the single phase AC power source. Estimating a position of the rotor by estimating a back electromotive force (back-EMF) based on an observer model with inputs indicative of the measured feedback signals, wherein the estimates of the back-EMF has a higher fidelity than a number of phases changes of the voltage polarity measured, ascertaining a polarity of the rotor based on the position of the rotor, and triggering the switch to supply power to the motor based on at least the polarity of the rotor.

In another aspect, the disclosure relates to a circuit for starting a U-shape single phase synchronous permanent magnetic motor (U-SPSPM motor) in a desired direction. The circuit includes an alternating current (AC) power source connected to a U-SPSPM motor having a rotor. A microcontroller coupled to the AC power source and to the U-SPSPM motor. A phase sensor connected between the AC power source and the microcontroller and configured to send a signal representative of zero crossing to the microcontroller. A current sensing circuit coupled to the microcontroller configured to send a signal representative of a current value to the microcontroller. A voltage sensing circuit coupled to the microcontroller configured to send a signal representative of a voltage value to the microcontroller. A triac connected in series between the AC power source and the U-SPSPM motor, and coupled to the microcontroller. And, an observer model in the microcontroller configured to determine a position of the rotor by determining a back electromotive force (back-EMF), wherein the determination of the back-EMF has a higher fidelity than the number of zero-crossings represented by the phase sensor signal.

DESCRIPTION OF EMBODIMENTS OF THE INVENTION

The invention is generally directed toward sensorless control of a U-SPSPM motor such as those that may be used in a drain system of a treating appliance such as a dishwasher or a washing machine. While the novelty of the claimed method is not limited to appliances, embodiments described herein will be in the context of appliances and, more specifically, to a dishwasher.

Figure 1:
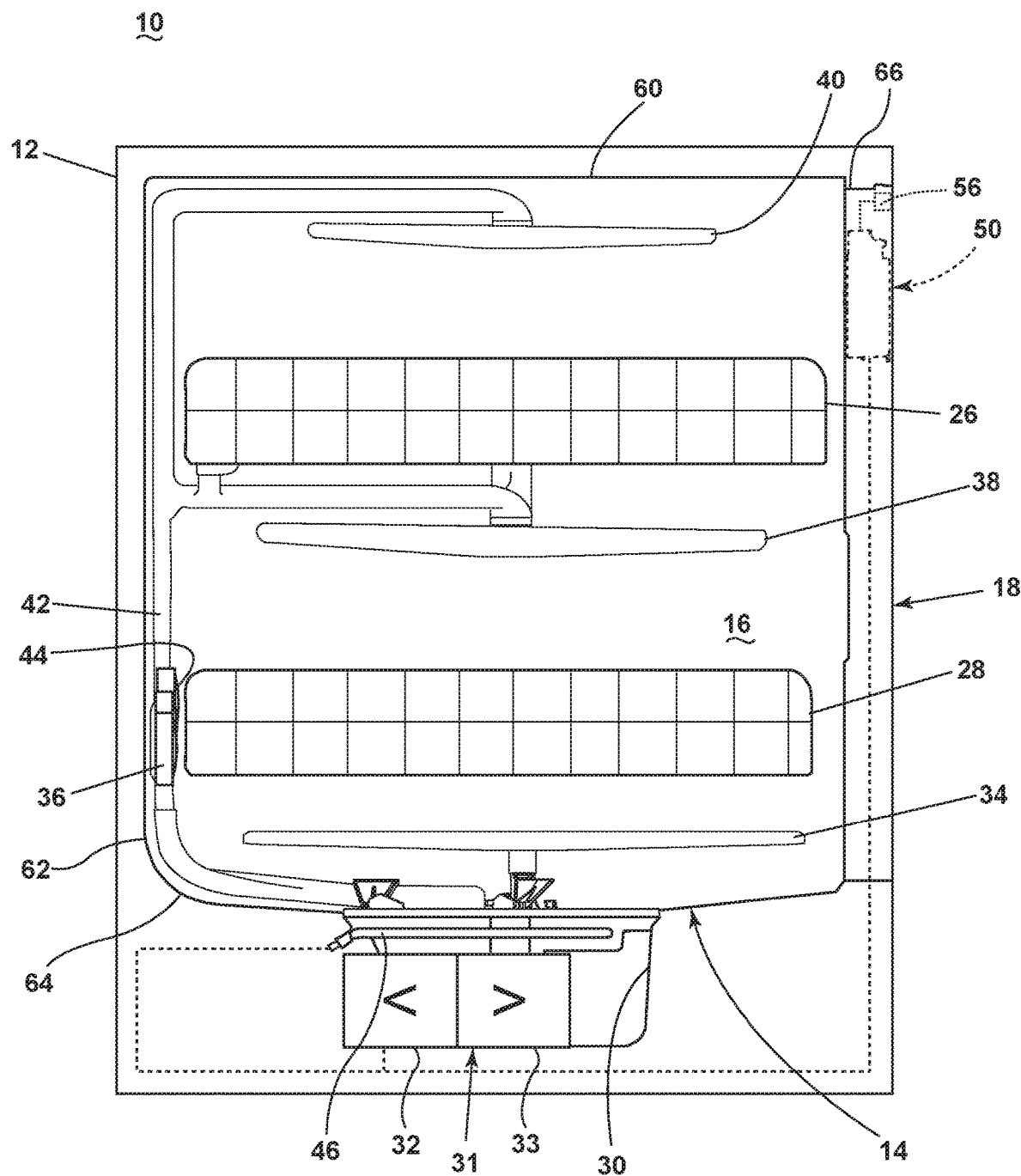
FIG. 1 is a schematic, side view of a dishwasher according to a first embodiment of the invention.

FIG. 1 is a schematic, side view of a treating appliance where a U-SPSPM motor may be used, illustrated here in the context of a dishwasher 10. While the illustrated treating appliance is a dishwasher 10, other treating appliances are possible, non-limiting examples of which include other types of dishwashing units, such as in-sink dishwashers, multi-tub dishwashers, or drawer-type dishwashers, washing machines, and other applications where a U-SPSPM motor is practical.

The dishwasher 10 may have a cabinet 12 defining an interior, which is accessible through a door (not shown). The cabinet 12 may comprise a chassis or a frame to which panels may be mounted. For built-in dishwashers, the outer panels are typically not needed. At least one wash tub 14 is provided within the interior of the cabinet 12 and defines a treating chamber 16 to receive and treat utensils according to a cycle of operation, often referred to a wash cycle whether or not washing occurs. The wash tub 14 has an open face that is closed by the door.

For purposes of this description, the term "utensil(s)" is intended to be generic to any item, single or plural, that may be treated in the dishwasher 10, including, without limitation; dishes, plates, pots, bowls, pans, glassware, and silverware.

One or more utensil racks, such as a lower utensil rack 28 and an upper utensil rack 26 may be provided in the treating chamber 16. The racks 26, 28 hold utensils (not shown) that may be treated in the treating chamber 16. The racks 26, 28 may be slid in and out of the treating chamber 16 through the opening closed by the door.

A liquid supply system is provided for supplying liquid to the treating chamber 16 as part of a wash cycle for washing any utensils within the racks 26, 28. The liquid supply system includes one or more liquid sprayers, which are illustrated in the form of spray arm assemblies 34, 38, 40, that are provided within the treating chamber 16 and are oriented relative to the racks 26, 28 such that liquid sprayed from the spray arm assemblies 34, 38, 40 may be directed into one or more of the racks 26, 28.

It should be noted that the stacked arrangement of the utensil racks merely serves to illustrate an environment for the invention. For example, the invention may be implemented in a stacked arrangement having a silverware basket, the lower and upper utensil rack, and with upper, middle, and lower level spray arm assemblies having spray heads for the silverware basket alternatively arranged in between the lower and upper utensil rack.

The liquid supply system further comprises a sump 30 to collect by gravity, liquid sprayed within the treating chamber 16. The sump 30 is illustrated as being formed with or affixed to a lower portion of the wash tub 14 to collect liquid that may be supplied into or circulated in the wash tub 14 during, before, or after a cycle of operation. However, the sump 30 may be remote from the wash tub 14 and fluidly coupled by suitable fluid conduits.

The liquid supply system further comprises a pump assembly 31 fluidly coupled to the sump 30, and as illustrated, may include a wash pump 32 and a drain pump 33. The wash pump 32 fluidly couples the sump 30 to the spray arm assemblies 34, 38, 40 through a spray arm supply conduit 42 to recirculate liquid that collects in the sump to the spray arm assemblies 34, 38, 40 for spraying via the racks 26, 28. The drain pump 33 fluidly couples the sump 30 to a drain conduit (not shown) for draining liquid collected in the sump 30 to a household drain, such as a sewer line, or the like. The wash pump 32 and/or drain pump 33 may be energized by a U-SPSPM motor (not shown explicitly in FIGS. 1 and 2).

While the pump assembly 31 may include the wash pump 332 and the drain pump 33, in an alternative embodiment, the pump assembly 31 may include a single pump, which may be operated to supply liquid to either the drain conduit or the spray arm support conduit 42 such as by rotating in opposite directions or by valves. In such a case the single pump may utilize a U-SPSPM motor.

Figure 2:
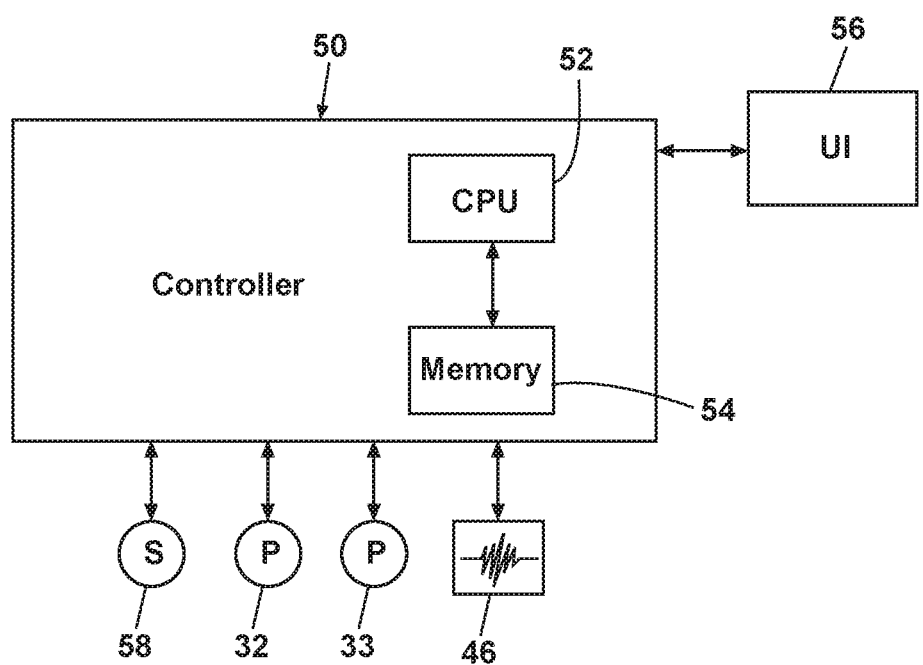
FIG. 2 is a schematic view of a control system of the dishwasher in FIG. 1.

The dishwasher 10 further comprises a control system having various components and sensors for controlling the flow and condition of the liquid to implement a wash cycle. The control system includes a controller 50 for implementing one or more cycles of operation. As seen in FIG. 2, the controller 50 is operably coupled to the pumps 32, 33, a heater 46, and one or more sensors 58 to either control these components and/or receive their input for use in controlling the components. The controller 50 is also operably coupled to a user interface 56 to receive input from a user for the implementation of the wash cycle and provide the user with information regarding the wash cycle. In this way, the controller 50 can implement a wash cycle selected by a user according to any options selected by the user and provide related information to the user.

The controller 50 may also comprise a central processing unit (CPU) 52 and an associated memory 54 where various wash cycle and associated data, such as look-up tables, algorithms, may be stored. Non-limiting examples of treatment cycles include normal, light/china, heavy/pots and pans, and rinse only. One or more software applications, such as an arrangement of executable commands/instructions may be stored in the memory and executed by the CPU 52 to implement the one or more wash cycles. The controller 50 may further include a clock (not shown). The clock may be alternatively located in another component operably coupled to the controller 50.

The user interface 56 provided on the dishwasher 10 and coupled to the controller 50 may include operational controls such as dials, lights, knobs, levers, buttons, switches, and displays enabling the user to input commands to the controller 50 and receive information about the selected treatment cycle. The user interface 56 may be used to select a treatment cycle to treat a load of utensils. Alternatively, the treatment cycle may be automatically selected by the controller 50 based on the soil levels sensed by any sensors in the dishwasher 10 to optimize the treatment performance of the dishwasher 10 for a particular load of utensils.

Figure 3:
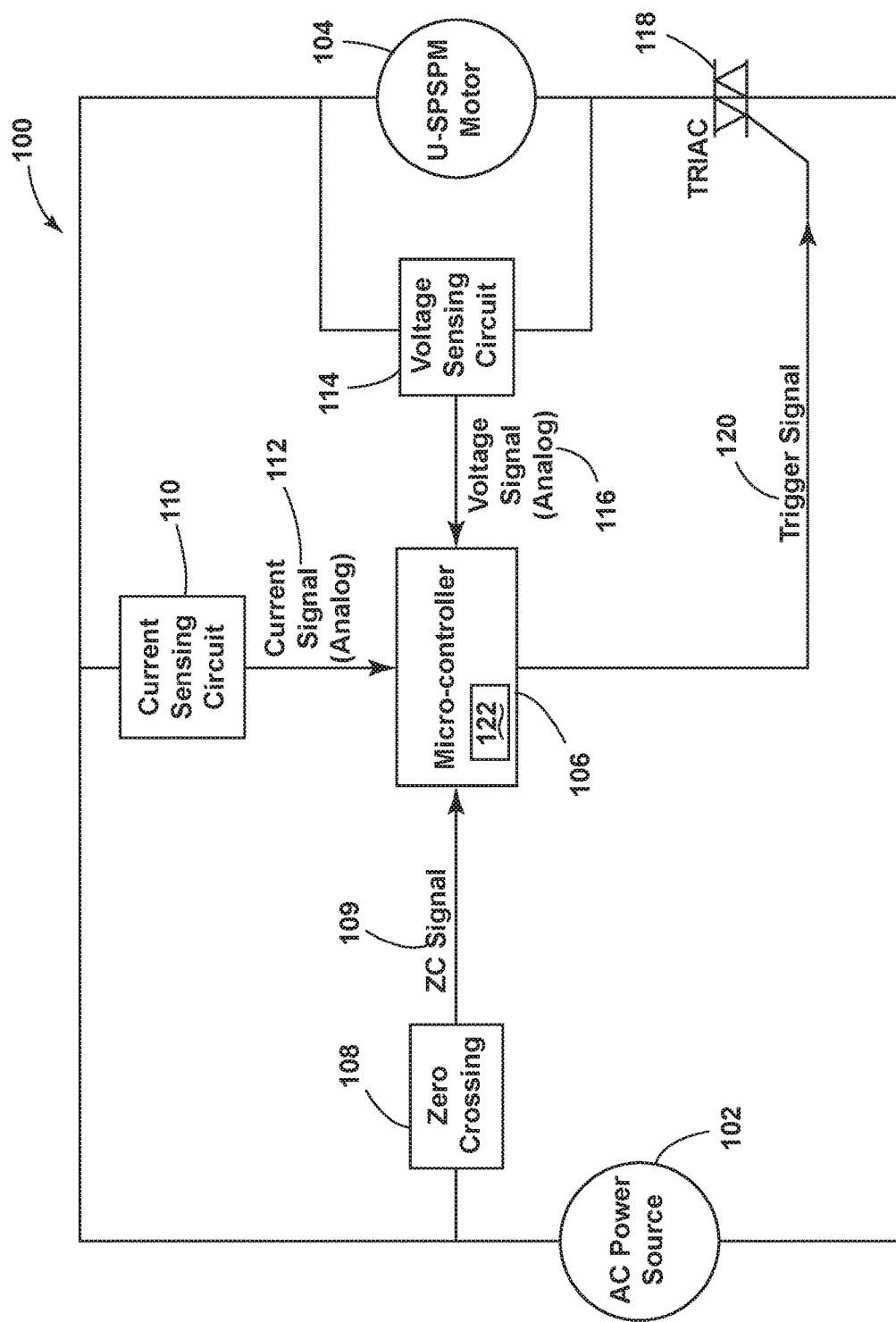
FIG. 3 is an enlarged schematic view of a circuit for a sensorless control in accord with the invention.

Referring to FIG. 3, a circuit 100 may be included at least partially in the controller 50. The circuit 100 includes a connection to an alternating current (AC) power source 102 and a U-SPSPM motor 104. The AC power source 102 in the United States is typically 120 volts and 60 Hz. A microcontroller 106, which may be the CPU 52 or which may be a distinct processor, is coupled to the AC power source by an observer circuit or sensor 108 that detects the zero crossing, i.e., phase, of the current flow and sends a ZC signal 109 representative of the phase of the voltage polarity to the microcontroller 106. The microcontroller 106 is also coupled to a current sensing circuit 110 that sends an analog signal 112 representative of a current value to the microcontroller. The microcontroller 106 is also coupled to a voltage sensing circuit 114 that senses voltage across the U-SPSPM motor 104 and sends an analog signal 116 representative of a voltage value to the microcontroller. A triac 118 in series between the (AC) power source 102 and the U-SPSPM motor 104 is coupled to the microcontroller 106. The triac 118, of course, switches power to the U-SPSPM motor 104 on or off, depending on a trigger signal 120 sent from the microcontroller 106.

The aforementioned structure provides a motor control system for controlling the U-SPSPM motor 104 by estimating rotor position without the use of a rotor position sensor. The system estimates the position of the rotor of the U-SPSPM motor 104 based on estimates of back electromotive force (back-EMF). The back-EMF is estimated by an observer model 122 in the microcontroller 106 based on the analog signal 112 for stator current, the analog signal 116 for stator voltage, and the ZC signal 109 for the AC zero-crossing (phase). The observer model 122 estimates the back-EMF at an arbitrarily fine time resolution to produce a high-fidelity back-EMF estimate. Prior art sensorless motor controllers only include measuring the back-EMF when the stator current is zero which limits the fidelity of the back-EMF estimate to the frequency of the input power source (e.g. a 60 Hz power source has a zero-crossing 120 times a second). Because the observer model 122 estimates the back-EMF with a high fidelity model, the control system can control commutation of the motor on a fine time scale that is independent of the AC power source. For example, the control system can trigger the TRIAC 118 based, in part, on the back-EMF estimate.

The back-EMF observer model relates stator current and stator voltage to back-EMF according using the following relationships. Stator winding voltage is obtained from equation (1):

$$u = r_A i_A + \frac{d\psi_A}{dt} = r_A i_A + L_A \frac{di_A}{dt} + e_0 \quad (1)$$

where $\mu$=stator voltage, $i_A$=stator current, $r_A$=stator resistance, and $L_A$=stator inductance. Back-EMF produced by the magnetic rotor is obtained from equation (2):

$$e_0 = -\psi_0 \sin\theta \frac{d\theta}{dt} = -\psi_0 \omega \sin\theta \quad (2)$$

where $e_0$=back-emf, $\Psi_0$=rotor flux constant, and $\omega$=rotor speed.

Preferably the circuit 100 provides contiguous (if not continuous) estimation of the back-EMF. That is, the voltage and current measurements occur at a sampling rate much higher (and not a function of) the mains power frequency because the current is directly included in the back-EMF model (instead of being ignored by only making measurements at the current zero crossing). Therefore, the control scheme includes estimating the back-EMF at arbitrarily fine resolution instead of being defined by the current zero crossing.

Figure 4:
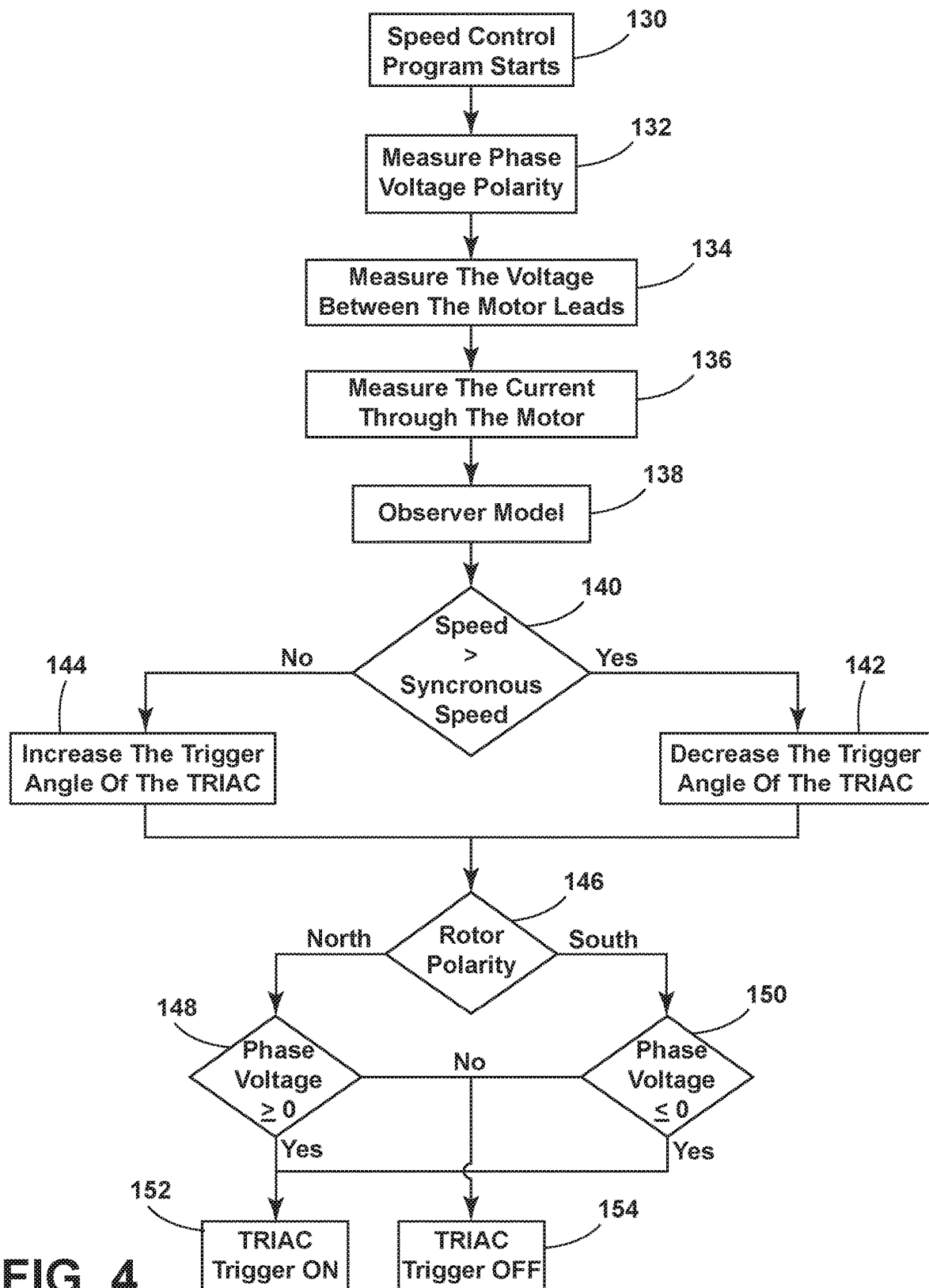
FIG. 4 is a flow chart of a method of sensorless speed control using the control circuit of FIG. 3.

Referring now to FIG. 4, a method for controlling the U-SPSPM motor 104 commences with a start of a speed control program 130 in the microcontroller 106. At step 132, the observer circuit or sensor 108 detects the zero crossing, i.e., phase, of the current flow and sends a ZC signal 109 representative of the phase of the voltage polarity to the microcontroller 106. At step 134, the voltage sensing circuit 114 senses voltage across the U-SPSPM motor 104 and sends an analog signal 116 representative of a voltage value to the microcontroller 106. At step 136, the current sensing circuit 110 sends an analog signal 112 representative of a current value to the microcontroller 106. At step 138, the microcontroller 106 operates the observer model 122 to estimate the back-EMF and the rotor position in the U-SPSPM motor 104. With the known rotor position from the observer model 122, the microcontroller 106 can compare the speed of the rotor with a predetermined synchronous speed for the U-SPSPM motor 104 at step 140. Based on that comparison, the microcontroller 106 can trigger or adjust the triac 118 to control the U-SPSPM motor 104. For example, if the speed is greater than the synchronous speed, the microcontroller 106 can decrease the trigger angle of the triac 118 at step 142. Conversely, if the speed is not greater than the synchronous speed, the microcontroller 106 can increase the trigger angle of the triac 118 at step 144. Either way, with the known rotor position from the observer model 122, the microcontroller 106 can ascertain the rotor polarity at step 146. If the polarity is north and the phase voltage is greater than or equal to zero at step 148, or if polarity is south and the phase voltage is less than or equal to zero at step 150, the microcontroller 106 can signal the triac 118 on at step 152. Conversely, if the polarity is north and the phase voltage is not greater than or equal to zero at step 148, or if polarity is south and the phase voltage is not less than or equal to zero at step 150, the microcontroller 106 can signal the triac 118 off at step 154.

Figure 5:
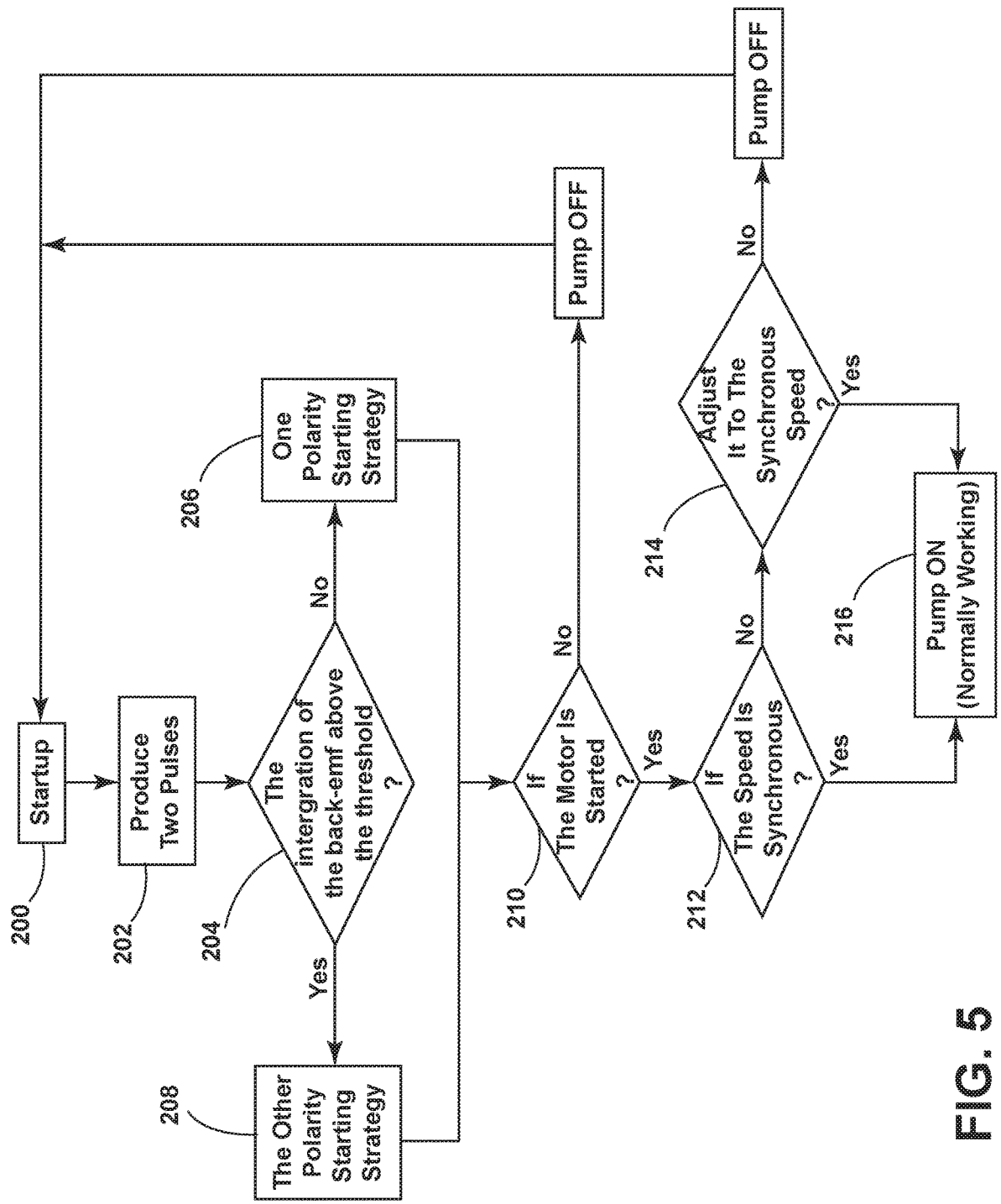
FIG. 5 is a flow chart of a starting strategy using the control circuit of FIG. 3.

FIG. 5 illustrates a starting strategy for the U-SPSPM motor 104 using the senseless control method of FIG. 4. At startup 200, the microcontroller 106 enables the triac 118 to allow two pulses to be sent to the U-SPSPM motor 104 at step 202. Meanwhile the observer model 122 estimates the back-EMF and the rotor position in the U-SPSPM motor 104 at step 204, and the microcontroller 106 determines whether an integration of the back-EMF exceeds a predetermined threshold. If the integration is less than the threshold, the microcontroller 106 initiates a start sequence for the U-SPSPM motor 104 for one polarity at step 206. If the integration is more than the threshold, the microcontroller 106 initiates a different start sequence for the U-SPSPM motor 104 for the other polarity at step 208. Based on the analog signals 112, 116, the microcontroller 106 can determine if the motor has started at step 210. If NO, then the associated pump (wash or drain for example) is off, and the method reverts to the startup 200. If YES, then the microcontroller 106 can compare the speed of the rotor with a predetermined synchronous speed for the U-SPSPM motor 104 at step 212. If NO, then the microcontroller 106 can adjust the triac 118 at step 214 as above to achieve synchronicity, and if not then, the associated pump will remain off. If synchronicity is achieved, then the associated pump will be ON and working normally at step 216.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method for starting a U-shape single phase synchronous permanent magnetic motor (U-SPSPM motor) in a desired direction having a rotor and a stator and coupled to a single phase alternating current (AC) power source through a switch, the method comprising:
   measuring a feedback signal representative of voltage across the motor leads;
   measuring a feedback signal representative of current through the motor;
   measuring a feedback signal indicative of a zero-crossing of the single phase AC power source;
   estimating a position of the rotor by estimating a back electromotive force (back-EMF) based on an observer model with inputs indicative of the measured feedback signals, wherein the estimates of the back-EMF has a higher fidelity than the number of zero-crossings measured;

ascertaining a polarity of the rotor based on the position of the rotor;

triggering the switch to supply power to the motor based on at least the polarity of the rotor.

2. The method of claim 1 wherein estimating back-EMF includes continuously estimating back-EMF.

3. The method of claim 1 wherein estimating back-EMF includes estimating back-EMF more than 120 times per second.

4. The method of claim 1 wherein estimating back-EMF occurs at a time scale independent of the single phase AC power source frequency.

5. The method of claim 1 further comprising estimating a rotational speed of the motor based on the estimates of the back-EMF.

6. The method of claim 5 wherein triggering the switch to supply power to the motor is further based on the estimates of the rotation speed of the motor.

7. The method of claim 1 wherein the feedback signal representative of the voltage across the U-SPSPM motor leads is measured by a voltage sensing circuit coupled to a microcontroller, and configured to send the feedback signal to the microcontroller.

8. The method of claim 1 wherein the feedback signal representative of the current through the U-SPSPM motor is measured by a current sensing circuit coupled to a microcontroller, and configured to send the feedback signal to the microcontroller.

9. The method of claim 1 wherein the feedback signal indicative of a zero-crossing of the single phase AC power source is measured by a phase sensor connected between the AC power source a microcontroller, and configured to send the feedback signal to the microcontroller.

10. The method of claim 1 wherein the switch is a triac and further comprising adjusting a trigger angle of the triac based on at least one of the back-EMF and a rotational speed of the motor and the position of the rotor.

11. The method of claim 1 further comprising comparing the speed of the rotor with a predetermined synchronous speed for the U-SPSPM motor.

12. The method of claim 11 further comprising adjusting the switch if the speed of the rotor is greater than or less than the synchronous speed.

13. The method of claim 12 wherein adjusting the switch includes decreasing a trigger angle of a triac.

14. The method of claim 12 wherein adjusting the switch includes increasing a trigger angle of a triac.

15. The method of claim 1 wherein the triggering includes setting the switch ON when polarity of the rotor is north and the phase value is greater than or equal to zero, or if polarity is south and the phase value is less than or equal to zero.

16. The method of claim 1 wherein the triggering includes setting the switch OFF when polarity of the rotor is north and the phase value is not greater than or equal to zero, or if polarity is south and the phase value is not less than or equal to zero.

17. A circuit for starting a U-shape single phase synchronous permanent magnetic motor (U-SPSPM motor) in a desired direction comprising:

an alternating current (AC) power source connected to a U-SPSPM motor having a rotor;

a microcontroller coupled to the AC power source and to the U-SPSPM motor;

a phase sensor connected between the AC power source and the microcontroller configured to send a signal representative of zero crossing to the microcontroller;

a current sensing circuit coupled to the microcontroller configured to send a signal representative of a current value to the microcontroller;

a voltage sensing circuit coupled to the microcontroller configured to send a signal representative of a voltage value to the microcontroller;

a triac connected in series between the AC power source and the U-SPSPM motor, and coupled to the microcontroller; and an observer model in the microcontroller configured to determine a position of the rotor by determining a back electromotive force (back-EMF), wherein the determination of the back-EMF has a higher fidelity than the number of zero-crossings represented by the phase sensor signal.

18. The circuit of claim 17 in a dishwasher where the U-SPSPM motor is associated with one of a wash pump or a drain pump.

* * * * *